E. ELLISON.
Corn Husking-Machines.
No. 154,132. Patented Aug. 18, 1874.
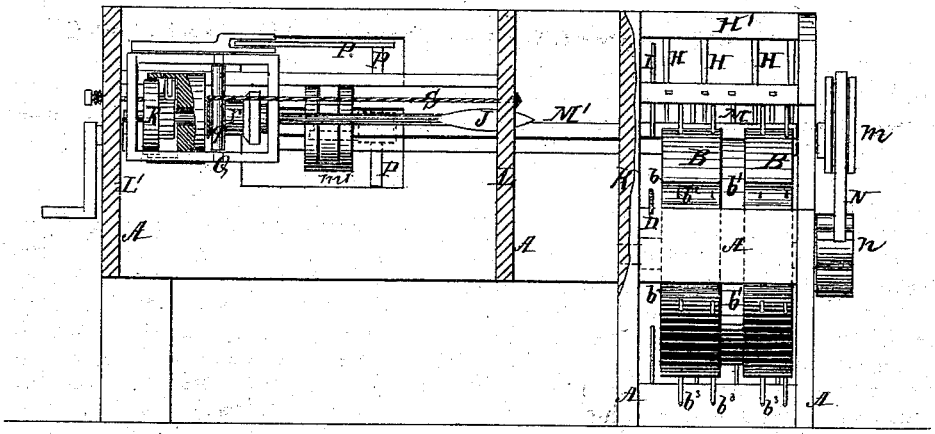
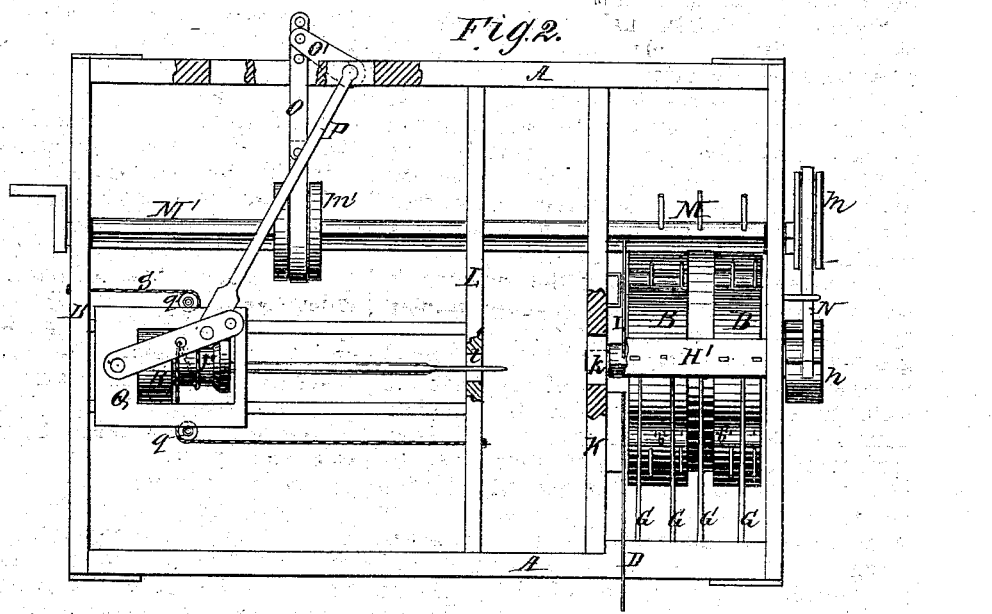
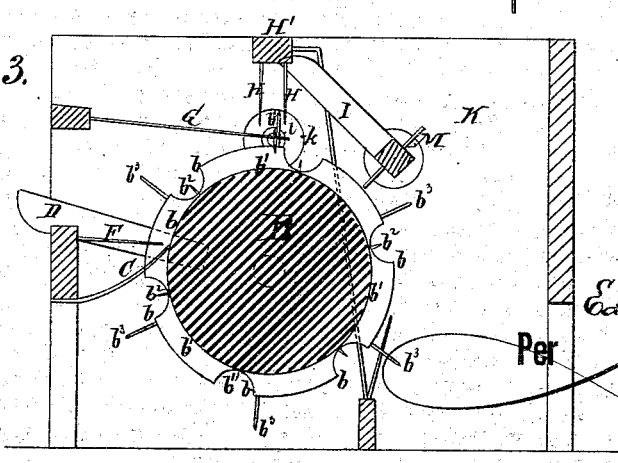
Witnesses:
G. Mathys.
John C. Kemow.
Inventor:
Edward Ellison.
Per
Attorneys.

UNITED STATES PATENT OFFICE.

EDWARD ELLISON, OF WAVERLY, MARYLAND.

IMPROVEMENT IN CORN-HUSKING MACHINES.

Specification forming part of Letters Patent No. 154,132, dated August 18, 1874; application filed December 24, 1873.

*To all whom it may concern:*

Be it known that I, EDWARD ELLISON, of Waverly, in the county of Baltimore and State of Maryland, have invented a new and Improved Corn-Husking Machine; and I do hereby declare that the following is a full, clear, and exact description of the same, reference being had to the accompanying drawing forming a part of this specification, in which—

Figure 1 is a longitudinal and sectional side elevation; Fig. 2, a plan view, and Fig. 3 a cross-sectional elevation.

The invention relates to means whereby corn may not only be denuded of the shuck, but at the same time relieved of the stem, and whereby the ear, the leaves of the shuck, and the excised stem may be discharged separately, the leaves being left in a state ready to be used for mattresses and kindred purposes.

A represents the frame of the machine, in which is journaled an intermittently-rotated cylinder, B, longitudinally and circularly grooved at $b\ b^1$, the first groove being intended to receive the unshucked ear of corn, and the latter to receive an upwardly-inclined spring-detent, C, that bears lightly on the bottom surface of groove. Ratchet-teeth may be placed in the groove $b^1$, if desired. In the middle of each groove $b$ is placed a row of small spikes, $b^2$, and in the rear a row of arms, $b^3$, against which also is partially supported the unshucked ear, and by which it may be raised. The unshucked ear is first placed on the inclined cutter-guide D, or directly in the longitudinal grooves $b$, so that the plane of stem-section will be clearly indicated, it being always intended to cut off the stem beyond the point of leaf-junction therewith. The inclined fingers F, upon which the ear also rests before it is raised, tend to throw it against the surface of the cylinder, so that when the arms $b^3$ come up between fingers F they will raise the ear against the downwardly-pressing spring-fingers G, which hold it to the cylinder. When the ear reaches the pointed pendent and elastic spikes H that are fixedly attached in a stock, H′, its husk is more or less penetrated by them. As it stops, the cutter I then comes down and cuts off the butt-end, so as to excise the stem with a small portion of each leaf. The stem then falls to the left of the partition of wire underneath the feeding-cylinder B, and the spear J is first thrust into the pith of the cob and then withdrawn with a twisting motion, which loosens the ear from the leaves, and creates sufficient friction to cause the ear to be taken from the leaves through the hole $k$ of cross-board K. Coming now against the small spear-hole $l$ of cross-board L, the husked ear drops down to the ground between the two boards K L. As soon as the ear is withdrawn, the spring-fingers G force the leaves down from the spikes H, the cylinder begins to turn, and the revolving rake M gathers and transfers the leaves to the ground or some suitable receptacle.

It will thus be perceived that the stems, naked ears, and leaves are all separated and dropped in different places.

I have three special objects in using the fingers G, namely, first, to hold the ear to the cylinder; secondly, to strip the leaves from the spikes after the ear is withdrawn by the spear; and, thirdly, to adapt the machine to ears of different lengths, the point of ear below a maximum being held against one or the other of the fingers not raised by the thickness of cob, which prevents the ear retreating while the spear enters it.

M′ is the drive-shaft, which may be operated by hand-crank or otherwise, and has an eccentric, $m$, on the end, which operates the yoke-pawl N and ratchet $n$, that together produce intermittent motion in the cylinder. This shaft M′ has also an eccentric, $m'$, connected by links O O′ with a bent rocking shaft, P, that reciprocates the spear-carriage Q. The spear is rigidly held in a stock, R, having a side pulley, $r$, while the carriage has two opposite and vertical friction-rolls, $q\ q'$. In the cross-board L is fastened one end of a cord, S, which is passed over a roll, $q$, around the pulley $r$, and over the opposite side of roll $q'$. Its other end is fastened on the cross-board L′.

During the forward movement of the carriage the spear remains stationary; but during its backward movement it is revolved by means of the cord and pulley $r$, the latter being connected to the shaft by pawl and ratchet.

Having thus described my invention, what I claim as new, and desire to secure by Letters Patent, is—

1. The combination of the grooved cylinder B, having arms $b^2$ and projecting points in the bottom of grooves, with a spring-holder, G, as described, to enable the unhusked ear to be raised and held while the stem is being cut, in the manner described.

2. The combination, with grooved cylinder B, having small points at the bottom of grooves, of the downwardly-projecting pendent elastic spikes H to hold the shuck while the ear is being turned therein, in the manner set forth.

3. In corn-huskers, the reciprocating spear J, arranged to pierce the cob, and rotate on its retreat to turn the ear in and relieve it from the shuck, as specified.

4. The combination, with intermittently-revolving cylinder B, having grooves $b$, of spring-fingers G and a stem-cutter, vibrating at the time and in the manner described.

5. The cutter-guide D, placed in the same vertical plane with the stem-cutter, and in line with the supporting-fingers F, and on opposite sides of the cylinder B, to indicate exactly where the chuck is to be laid to give the proper plane of section, as set forth.

6. The reciprocating spear-carriage provided with the two vertical friction-rolls, and the spear-stock having side pulley, combined with the cord, as and for the purpose specified.

EDWARD ELLISON.

Witnesses:
CHARLES M. RAHE,
HENRY C. HUFF.